J. F. MALETTE.

WRITING TABLET.

No. 10,198. Reissued Sept. 19, 1882.

WITNESSES:

Fred. G. Dieterich.

Wm Nichols

INVENTOR.

John F. Malette

ATTORNEYS.

N. PETERS, Photo-Lithographer, Washington, D. C.

UNITED STATES PATENT OFFICE.

JOHN F. MALETTE, OF WATKINS, NEW YORK.

WRITING-TABLET.

SPECIFICATION forming part of Reissued Letters Patent No. 10,198, dated September 19, 1882.

Original No. 246,023, dated August 23, 1881. Application for reissue filed August 5, 1882.

*To all whom it may concern:*

Be it known that I, JOHN F. MALETTE, of Watkins, Schuyler county, New York, formerly of 98 Pembroke street, city of Boston, State of Massachusetts, have invented certain new and useful Improvements in Writing-Tablets; and I do hereby declare that the following is a full, clear, and exact description of my invention, which will enable others skilled in the art to which it appertains to make and use the same, reference being had to the accompanying drawings, and to letters of reference marked thereon, which form a part of this specification.

This invention relates to writing-tablets and blank books of various kinds having sheets of blotting-paper permanently but flexibly attached to them.

The nature of my invention consists in connecting a sheet of blotting-paper to the cover or lid of the book by means of stitches arranged in diagonal rows intersecting each other between the cover and blotter to form a flexible connection therefor, said rows of stitching serving as braces or ties to prevent tearing of the blotter, as will be hereinafter explained.

It also consists in an upper cover or lid made in two parts with a flexible joint, the smaller part being adapted to fold upon the back edge of the tablet and the larger part upon the base, as hereinafter explained.

Figure 1:
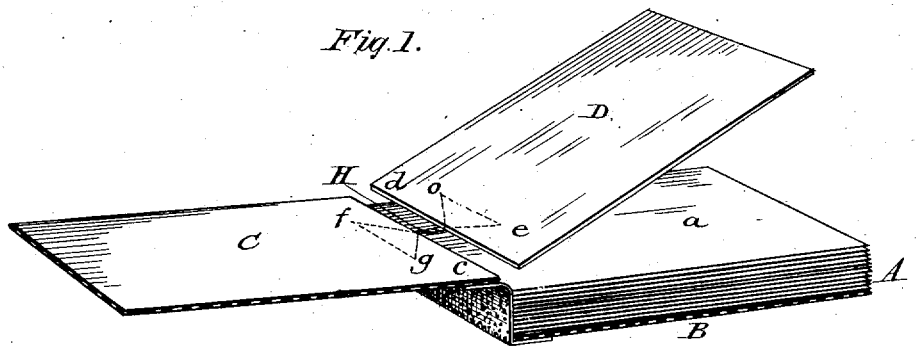
Figure 2:
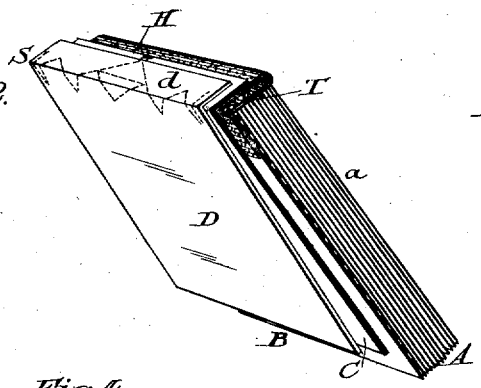
Figure 3:
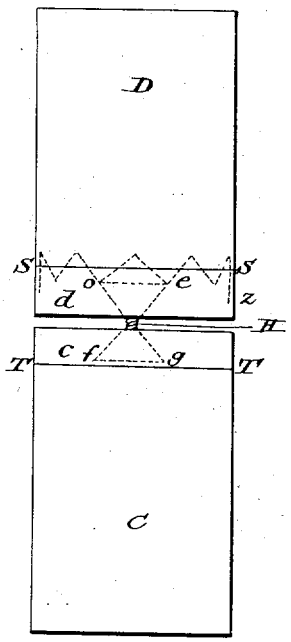
Figure 4:
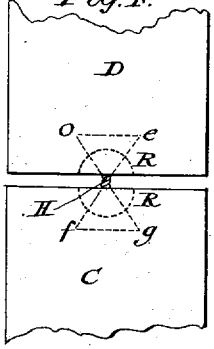
Figure 5:
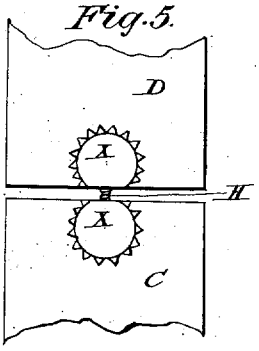
Figure 6:
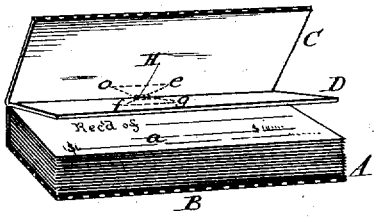

Figures 1, 2, and 6 are perspective views; Figs. 3, 4, and 5, sectional views.

Similar letters of reference denote like parts in all the figures.

In the annexed drawings, Fig. 1, A represents a blank book, made by pressing evenly together at one end a number of blank sheets, *a*, and an under cover, B, and an upper cover, C, of pasteboard, then pasting a cloth to the edge of these sheets *a* and covers B and C at said end, thus forming the back in the ordinary way, and in contact with this upper cover or lid, C, on the inside, at the edge *c*, I place the blotter D at one edge, *d*, and sew or stitch through the blotter with thread or other suitable material from *e* in a line across the seam (formed between the blotter and cover) to *f*, thence to *g*, thence again across the seam in a line to *o*, thence to *e*—the starting-point. Then, revolving the blotter around the point where the two lines of stitching cross in the seam, a strong cord or thread, H, is formed, which not only allows the blotter to revolve freely, but which securely fastens the blotter to the cover. The blotter is then conveniently used to removed moist ink remaining after a page is written, as on every succeeding exposed page or sheet through the entire book.

To turn the cover and blotter back under the book requires in each a second flexible joint or brake. To effect this two strips are cut the size of the back—namely, from the blotter D one strip, *d*, (see Fig. 3,) which is refastened to the blotter by stitching several times to the right and left across the seam *s* from *z* to *z*, as shown, and from the upper cover or lid, C, one strip, *c*, which is also retained in its place (when bound) by the cloth from the back, which is cut wide enough to paste across this strip *c*, also fastening the principal part of the cover or lid C. By thus cutting and rejoining (although the strips still retain their former place) perfectly flexible joints S S T T are formed, so that the blotter and cover may be turned back under the book without injury to either blotter or cover or back, as shown in Fig. 2. Before stitching the blotter and cover together a small piece of cloth may be pasted around the edge of each (see dots at R R, Fig. 4) to protect it at the point where the cord H is attached to the edge of the blotter or cover. The stitching is then made through the additional thickness. This is needed only where unusual strength is required. Sometimes a small ornament of paper, leather, or cloth is pasted over the stitching, as shown in Fig. 5, *x x*.

Fig. 6 represents a book with revolving blotters attached, with back at the longest side, such as receipts, notes, checks, &c. As the cover and blotter are narrow, they are made without the joint, not being required to turn the back under the book, as represented in Fig. 2.

By means of the intersecting diagonal stitches I not only form a flexible connection between the cover and the blotter which will allow the latter to be turned over, but by reason of the angular arrangement of the stitches I avoid liability of tearing the blotter at its connecting-point, should it be subjected to lateral or sidewise strain, as such strain would be in line with one or the other of the rows of diagonal stitches.

Having thus described my invention, what I claim is—

1. The combination, with the upper cover or lid of a blank book or writing-tablet, of a blotter-sheet and a flexible connection therefor, the latter being formed by diagonal intersecting rows of stitches connected by transverse rows of stitches, in the manner and for the purpose set forth.

2. The writing-tablet, substantially as hereinbefore described, provided with an upper cover or lid made in two parts, C *c*, with a flexible joint, T, the part *c*, being adapted to fold upon the back of the tablet and the part C upon its base.

In testimony whereof I affix my signature in presence of two witnesses.

JOHN F. MALETTE.

Witnesses:
D. P. COWL,
GEO. R. BYINGTON.